May 20, 1947.  J. O'D. SHEPHERD  2,420,798
APPARATUS FOR AND PROCESS OF TAKING AND SHOWING SOUND MOTION PICTURES
Filed July 13, 1942  2 Sheets-Sheet 1
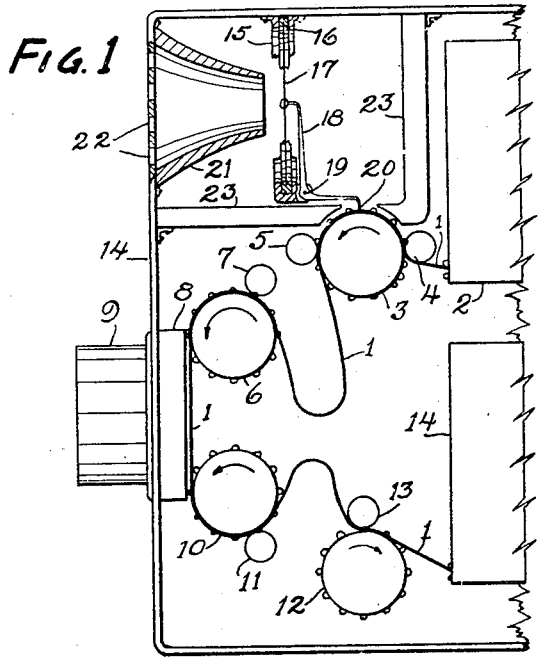
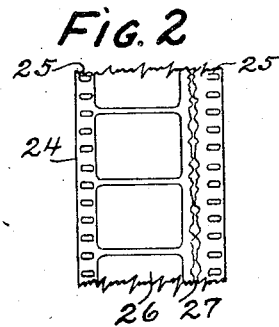
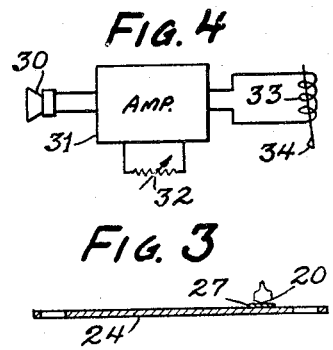
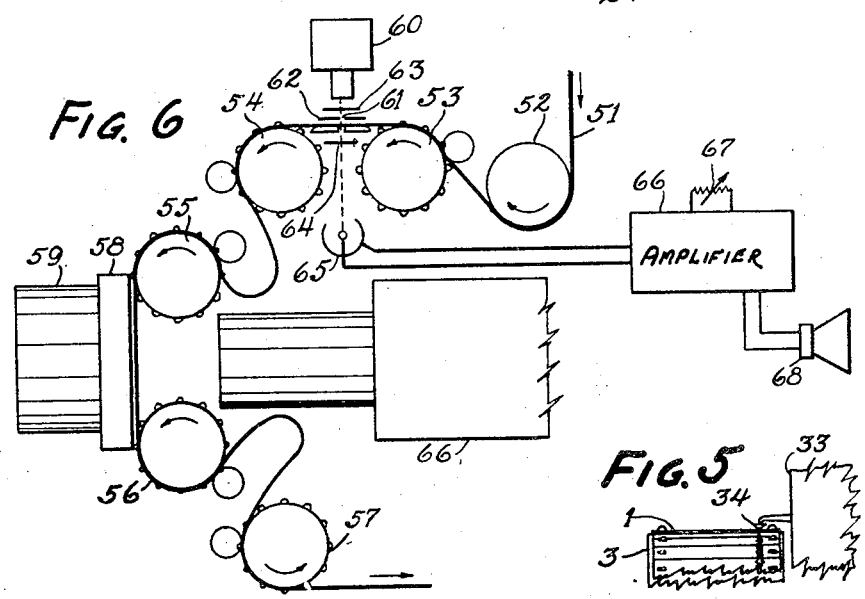
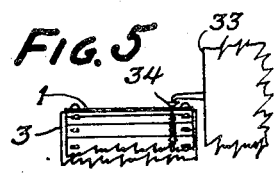
INVENTOR
Judson O'D Shepherd May 20, 1947.  J. O'D. SHEPHERD  2,420,798
APPARATUS FOR AND PROCESS OF TAKING AND SHOWING SOUND MOTION PICTURES
Filed July 13, 1942  2 Sheets-Sheet 2

INVENTOR
Judson O'D Shepherd

Patented May 20, 1947

2,420,798

UNITED STATES PATENT OFFICE 2,420,798

APPARATUS FOR AND PROCESS OF TAKING AND SHOWING SOUND MOTION PICTURES

Judson O'D. Shepherd, Atlanta, Ga.

Application July 13, 1942, Serial No. 450,789

12 Claims. (Cl. 88—16.2)

This invention relates to improvements in sound moving pictures and in particular to the recording and reproduction of sound in conjunction, respectively, with taking and projecting of moving pictures.

The widely used commercial arrangements employing sound on film provide a photographic record of the sound waves on a sound track. This requires a delicate and costly arrangement to convert the sound waves into light modulations and expose the sound track to such modulated light in order to make a record. This sound record must then be photographically processed.

One feature of the present invention is to record on the film the sound accompanying the picture in such manner that the sound track does not require processing. This has particular advantages in connection with so-called home movies where the positive film is processed from the originally exposed film since only the photographic record need be developed.

The optically active property of certain materials, such as Cellophane, is well known. Polarized light passed through such a material is rotated. An analyzer, which may be a sheet of such material as "Polaroid," can be rotated to extinguish the beam after it passes through such material. A trace made by a cutting or distorting member, such as a knife, on the optically active material will result in a bright line as viewed by the analyzer. By proper shaping of the cutting or distorting blade the width and depth of the trace will be a function of the pressure of it on the material.

This principle is involved in the present invention as well as in my application Serial No. 423,-450, filed December 18, 1941.

The film employed is of optically active material such as Cellophane, or the sound track is of such material and a photographic emulsion is provided. A cutting or distorting member is driven in response to sound waves to provide a record of such waves in the form of a trace on the sound track of the film at one point, while another section of the film is concurrently being exposed photographically. The film may then be developed photographically. Projection of the picture frames may be done in conventional manner. A scanning beam of polarized light is projected through the sound track toward a photo-cell. Polarizing means such as a sheet of Polaroid is interposed between the film and the cell in the path of the beam and normally oriented so as to extinguish the beam. The sound record causes the light of the beam to be rotatively modulated, and the polarizing medium will convert these rotative modulations into light intensity modulations detectable by the photo-cell. The latter cell is connected through a conventional amplifier to a loud speaker or the like for completion of the conversion of the record into sound waves.

This invention is set out by nine figures of the drawings as follows:

Figure 1 is a schematic presentation of a camera-recorder with the cover removed and some of the parts in section;

Figure 2 shows a portion of film bearing a picture and sound record;

Figure 3 indicates an enlarged cross-section of the film indicating the relation of the cutting or distorting member to the film, and also indicates an optically active sound path which may be applied to an optically neutral film;

Figure 4 shows an alternative recording arrangement employing an electrical sound pickup;

Figure 5 indicates the relation between a magnetic recorder, such as may be used with the arrangements shown by Figure 4, and the film, and Figure 6 shows schematically a projector-reproducer which may be used.

Figure 7:
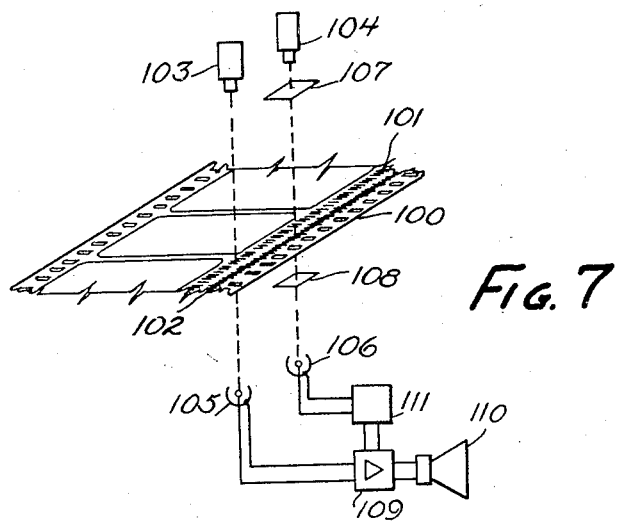

Figure 7 indicates a film bearing a photographic sound record and light rotative control record, with means to scan the two records independently and to control the sound record by the light rotative one.

Figure 8:
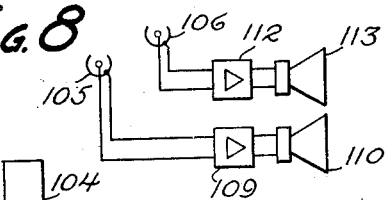

Figure 8 is similar to Figure 7, with arrangements to independently reproduce two sound records, one of which is photographic and the other light rotative, for biaural effects.

Figure 9:
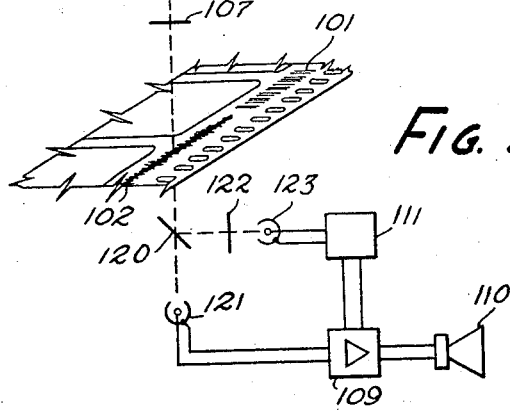

Figure 9 shows a photographic and light rotative sound tracks superimposed, with means to independently reproduce them.

Referring to Figure 1, film 1 is supplied from a container 2, which may be provided with a roll of unexposed film. This film is driven at a constant rate of speed by sprocket wheel 3, against which it is held by idlers 4 and 5 which are normally maintained against the sprocket wheel by a spring lever, not shown. The film then passes over sprocket wheel 6, against which it is held by an idler 7 sprung toward it. The film then passes the shutter mechanism 8 where it is exposed to the image of the photographed object or scene focused on it by a lens system indicated by 9. The shutter and lens systems may be of any suitable conventional form known to the photographic art. The film then passes around a portion of sprocket wheel 10, against which it is held by sprung idler 11, and thence around a portion of sprocket wheel 12, against which it is held by sprung idler 13. Container 14 has a takeup reel, not shown. The camera casing is light proof.

The mechanism set out above may be driven by any suitable means including a manually operable crank, a spring motor or an electric motor. Where driving arrangements are employed which are other than of constant speed type, it is contemplated that a conventional friction governor, or the like, may be provided to maintain a very constant speed. By means not shown, but which are well known to the art of motion picture cameras, sprocket wheels 3 and 12 are driven at a constant speed while sprocket wheels 6 and 10 are driven intermittently in order to advance the film a frame at a time for exposure. The driving arrangements also contemplate that the take-up reel in container 14 will be driven through a friction element to maintain the film to the right of sprocket wheel 12 in tension. Loops are provided in the film between the constant speed sprocket wheels and the intermittently driven ones as is usual with such arrangements.

Attached to the camera casing 14 is a ring 15, partly in section and partly broken away, supporting, by resilient ring 16, also partly in section and partly broken away, a diaphragm 17 of suitable material, such as mica, to be responsive to sound waves. Affixed to the center of this diaphragm is a lever 18 which is pivoted at 19. This lever is formed into a bell crank terminating in a cutting or distorting member 20 adapted to cut, distort or deform, or a combination of these, the sound track of the film. The diaphragm, with its support, and lever 18, and its pivot 19, are similar to the sound box of mechanical phonographs and sound recorders employing disc or cylinder records, and I may, in practicing my invention, employ detail arrangements with respect to these elements which are known to those arts. A member 21, shown in section, directs the sound, which is received through perforations 22 of the camera casing, against the diaphragm 17. It is contemplated that appropriate modifications of the mechanical structure may be made to enable the employment of a relatively large megaphone-like element to increase the intensity of the sound waves impinging on the diaphragm. The sound recording elements may be enclosed in a sound absorbing barrier 23 in order to reduce the recording of background noise arising from the camera mechanism. The acoustic elements may also be mounted on resilient material to further reduce such noise. A portion of the sound absorbing barrier may also be shaped around the left hand side of the diaphragm to form a light barrier.

The member 20 engages the sound track as the film passes over sprocket wheel 3. It is contemplated that resilient mounting of the sound elements including ring 16 may be such as to give an appropriate normal pressure of member 20 on the film. Wheel 3 may be provided with a spring mounting in order to provide an appropriate recording pressure against the member 20 and/or to enable the wheel 20 to be pulled down to facilitate loading the camera. Instead of recording the sound on the film as it passes over a sprocket wheel, I may record it in a manner similar to those shown in the Vermeulen et al. Patent No. 2,154,589, dated April 18, 1938.

During the taking of pictures and recording of sound the camera is directed toward the object, focused and started by conventional means not shown. Sound waves striking diaphragm 17 will impart motion to lever 18 which in turn drives member 20 to cut, distort or deform the sound track to make a record of the sound simultaneously with the photographic exposition of the film.

Figure 2 shows a developed film 24 which may be used. It has sprocket holes 25, frames of pictures 26 and a sound track 27. The action of member 20 in response to sound waves will leave on the sound track a record of the sound waves in the form of light rotative modulations. Film of the familiar 35 mm. type is indicated with sprocket holes near each edge but it is to be understood that film of the 16 mm. type with sprocket holes along one edge or 8 mm. type with a sprocket hole for each frame located in the center of the film between the frames may be used, with an appropriately different mechanical structure of the camera.

Figure 3 shows the relation of the member 20 to the sound track, here indicated as a strip 27 of optically active material applied to the film. It will be understood that where the film itself is of optically active material, the member 20 will engage the film directly. Where a separate sound track strip is employed, as shown by Figure 3, it may be provided as a dry strip and cemented to the film or it may be extruded in plastic form upon the film as the latter progresses in a manufacturing process. With the latter process, the rate of progress of the film may be greater than the rate of flow of the optically active material from the extrusion orifice so that the material will undergo elongation or stretching to secure appropriate orientation of the molecules for the desired optically active property. The sound track, whether on a film of optically active material or an applied strip of such material, may be on either the emulsion or the other side of the film, with the recording and reproducing arrangements adapted thereto. The member 20, or its edge, may be of sapphire or other material having proper wearing qualities for its purpose. The member 20 may be a separate element with arrangements to permit its replacement or adjustment, as with the playing stylus of a phonograph.

The arrangement of Figure 1 contemplates the driving power for member 20 be derived from the energy of the sound waves. I may elect to drive said member electrically and such an arrangement is indicated schematically by Figure 4. A sound pickup device 30, such as a microphone, is connected through a conventional amplifier 31 having a gain control indicated as 32. The output of this amplifier is connected to the coil 33. This coil and its associated magnetic and mechanical structure may be similar to a familiar magnetic phonograph pickup or recorder, with a member 34, corresponding to member 20, to place light rotative modulations on the sound track of the film as a substitute for the stylus employed with phonographs. The relation of the member 34 to the film and the coil assembly is indicated by Figure 5.

After the film has been exposed it may be developed by conventional means. These arrangements contemplate the use of either black and white, or colored pictures.

A projector with a sound reproducer is shown schematically by Figure 6. Developed film 51 is supplied from a reel not shown. It passes around a portion of idler 52 and thence around a portion of sprocket wheels 53 and 54, both of the latter being driven at a constant speed. It then is driven intermittently, frame at a time, by sprocket wheels 55 and 56. Sprocket wheel 57 is driven at the same constant speed as wheels 53 and 54 and delivers the film to a friction driven takeup reel, not shown. Idlers sprung toward the sprocket wheels maintain the film against the latter. A conventional shutter mechanism 58 and lens system 59 for projecting the pictures are indicated. The picture projecting arrangements set out, including a light source 66, are substantially those found in commercial projectors and may be widely varied to achieve the purpose of projecting the pictures, the only particular requirement is that a section of the film moving at constant speed be presented to the scanning arrangements which will be described, and which are shown here as being located between sprocket wheels 53 and 54. It is appropriate that the distance as measured along the film between the scanning and projecting arrangements shall be substantially the same as that between member 20 of Figure 1 and the point where the film is photographically exposed, in order to secure proper synchronism between the sound and the picture.

A light projector 60 furnishes a beam of constant intensity light to the sound track of the film as it progresses. This may be arranged to focus the image of a slot on the film, said image being in the order of 1 mil wide at the focus on the film. An opaque screen 62, with a narrow slot 61, may also be provided, or provided as a substitute for the focusing of the image of a slot. The arrangements described may be identical with those currently used in commerce with talking moving picture machines, and are subject to the same skillful practices of this art, it being sufficient to state that arrangements are provided to scan the film track with a thin ribbon of light.

The scanning beam is polarized by medium 63, which may be Polaroid or the like, or any other of various known means effective to polarize light in a suitable manner and extent. Below the film is a second polarizing means 64, which may be of the same material as 63, so oriented as to substantially extinguish the beam with the film in place, but not carrying a sound record. The polarizing media may be rotatable for adjustment or removable. The scanning beam is directed to a photo-cell 65, and a lens system, not shown, may be included to focus the beam into the cell.

With the above arrangement, the scanning beam is normally extinguished by the polarizing media when the sound track of the film does not carry modulations, as stated. Where such modulations occur they will rotate the light of the beam to cause it to be visible, by virtue of the lower medium, to the photo-cell, the amount or extent of such rotations and therefore the intensity of the light reaching the photo-cell will depend upon the magnitude of the modulations of the sound track.

The photo-cell 65 is connected to a conventional amplifier 66 having a volume control indicated as 67. The output of this amplifier is connected to a loud speaker 68 which produces the sound accompaniment of the film.

The light focused on the sound track of the film may be relatively strong and the film may be subjected to a destructive amount of heat if it should be stopped. It is contemplated that protective arrangements may be provided which will extinguish the scanning light or interpose a light barrier between it and the film. The latter may be similar to the familiar "fire screen" used in moving picture practice to protect the film from the projecting beam should it be stopped, and may be similarly operated. It is also contemplated that where the projecting beam may be furnished by a light source of uniform intensity a suitable optical system may be provided to direct a portion of the light from this source to provide a scanning beam for the sound track.

The scanning beam may be of monochromatic light which may be secured by a light filter incorporated in the projector or intersecting the beam. With certain polarizing media, such as "Polaroid," the extinction of the beam is not complete but there remains a small amount of purplish light transmitted. By providing a light filter of appropriate shade, the extinction can be made substantially complete. This filter may, of course, be provided below or above the film to accomplish this result, or at both locations. Also, one or the other, or both, polarizing media may serve as the color filter by having the substance which carries the polarizing particles stained or otherwise appropriately colored, or a color medium attached to one or the other, or both, polarizing media.

The arrangements described are particularly applicable where a single copy of film is required, as with home movies in which the positive is processed from the originally exposed film. Multiple copies may, however, be readily prepared. With the latter arrangement it is contemplated that the originally exposed film may carry the sound record as light rotative modulations on an optically active sound track. This negative may be employed with a photographic printer to produce positive film prints. As a part of the printer arrangements, the sound track of the negative may be scanned with polarized light substantially as set out above, and the output of an amplifier such as 66 may be used to energize a recording coil such as 33 to drive a member 34 adapted to place light rotative modulations on an optically active path of the positive film being printed. It is further within the scope of this invention to employ a conventional sound on film negative print to make positive prints bearing a light rotative record on its sound track. Such arrangements may employ substantially conventional scanning means for the negative sound track, an electrical inverter to compensate for a negative rather than a positive sound track and an electrical recorder such as 33 and 34 driven by a circuit from the scanning tube amplifier to make a light rotative record on the sound track of the positive film, at least the sound track of said film being, of course, optically active. With appropriate means which will be understood, sound from a phonograph record may be re-recorded, or "dubbed in," as a sound accompaniment on an optically active sound path of a film by use of a magnetic recorder such as 33 and 34.

By appropriate design of the characteristics of the arrangements described, projecting facilities may be employed which can project moving pictures and reproduce sound from conventional film bearing a photographic sound record or from film having a light rotative record. Such a projector may be provided with polarizing media such as 63 and 64 which may be used with light rotative sound tracks. When film with a photographic sound record is employed, one or the other, or both, of the polarizing media may be removed, or one may be rotated to eliminate the extinction of the scanning beam. It is to be understood that with such arrangements, provisions for appropriate adjustment of the amplifier and other parts may be made for each type of film.

A light rotative record may be used on the same film with a photographic sound track. Figure 7 indicates such an arrangement in which 101 is the photographic and 102 is the light rotative track on moving picture film 100. Scanning beams from projectors 103 and 104 scan respectively these two tracks and the modulated beams are received by photo cells 105 and 106, respectively. Appropriately oriented polarizing media 107 and 108 are provided above and below the film to intersect the scanning beam of the light rotative track. The output of cell 105 is amplified by amplifier 109 and supplied loud speaker 110. The output of cell 106 is amplified by 111 and employed to control the gain of amplifier 109. This control may depend upon amplitude or frequency of the light rotative track as elected in practicing this invention by suitable design of element 111, forms of which are well known.

Figure 8 indicates the use of two sound tracks as described but with two independent amplifiers and two speakers, 112 indicating the amplifier and 113 the loud speaker for the light rotative sound track. Biaural effects may be secured with this arrangement as will be understood since the two sound tracks may be prepared from separate, spaced microphones as is conventional with biaural recording.

Inasmuch as the light rotative modulations are substantially transparent to unpolarized light, the two sound tracks may be superimposed, preferably with the photographic track on the emulsion and the light rotative one on the reverse side of the film. This arrangement is shown by Figure 9. With this arrangement the control channel preferably would be frequency modulation of the optically active path with the sound record on the photographic path, frequency modulations for control being chosen so that with an appropriate automatic volume controlled amplifier they would be independent above a certain minimum light intensity and therefore unaffected by the photographic track except where the latter extinguishes the beam beyond this minimum. The two records may be exactly superimposed by employing a polarized scanning beam, with a partially silvered mirror 120, or the equivalent, adapted to divide the beam and direct part into photo-cell 121 for the photographic sound record and the remainder through a properly oriented polarizing medium 122 to a second photo-cell 123 for the light rotative or control channel. Both tracks may be sound records, with separate loud speakers to provide biaural or auditory perspective effect as indicated by Figure 8. This may be illustrated by having a loud speaker on the right of the screen controlled by the photographic sound record and one on the left controlled by the light rotative record. With this arrangement a question may be asked by a picture character on the right of the screen which will be heard from the loud speaker on the right, and answered by a character on the left, the answer being heard over the speaker on the left. The operation of the latter arrangement will be facilitated by having the photographic sound track clear when the optically active one is effective.

The superimposed sound tracks may, of course, be scanned by separate beams, substantially in accordance with Figures 7 and 8.

The mechanical structure of the camera-recorder and/or the projector-reproducer may be widely varied within the scope of this invention. The arrangements may provide for the sound record to be ahead of rather than behind the corresponding picture frame. It is also contemplated that a common camera-projector may be provided with photographic and sound recording arrangements on the one hand, and both projecting and sound reproducing elements on the other. Other variations of the arrangements may be made by the skillful within the scope of the appended claims.

What is claimed is:

1. The method of showing sound moving pictures from a film having sequential frames of picture transparencies and a sound track bearing a sound record comprising light rotative modulations which consists in optically projecting the picture frames in sequence, scanning the sound track of the film with polarized light which is rotatively modulated by the record and converting the rotatively modulated light into sound waves.

2. The method of showing moving pictures with sound accompaniment from film having sequential frames of picture transparencies and a normally transparent sound track bearing a sound record comprising light rotative modulations which consists in driving a portion of the film intermittently a picture frame at a time, optically projecting sequentially the picture frames of the aforesaid portion of the film, concurrently driving a second portion of the film at uniform speed, scanning with a thin beam of polarized light the sound track of the film at a point on the second mentioned portion of the film, the modulations of said sound track being effective to rotatively modulate rays of the scanning beam, and converting the rotatively modulated rays into sound corresponding to the record on the sound track.

3. The method of showing sound moving pictures as set forth by claim 2 further characterized by scanning the sound track with a thin beam of monochromatic polarized light.

4. A projector of sound moving pictures from a film bearing sequential frames of picture transparencies and a sound track bearing a sound record comprising light rotative modulations including means to project the pictures in sequence a frame at a time, means to project a scanning beam of polarized light through the sound track of the film to rotatively modulate rays of the beam and means to convert the rotatively modulated rays into sound corresponding to the sound record.

5. A projector of sound moving pictures from a film bearing sequential frames of picture transparencies and a sound track bearing a sound record comprising light rotative modulations including means to drive a section of the film intermittently a frame at a time, means including a light source to project the individual frames of the film in sequence while each frame is at rest, means to drive a second section of the film at a constant speed, means to project a beam of polarized light through the sound track of the section of the film being driven at constant speed, said sound track being effective to rotatively modulate rays of the beam, and means to convert the rotatively modulated rays into sound.

6. A device for projecting moving pictures and reproducing a sound accompaniment thereto from a film bearing sequential frames of picture transparencies and an optically active sound track bearing a sound record comprising light rotative modulations including means to optically project sequentially the picture frames, means to concurrently drive a portion of the film at uniform speed, means to project a scanning beam of polarized light through the sound track of the film at a point of the portion being driven at uniform speed, the modulations of the sound track being effective to rotatively modulate rays of the scanning beam in accordance with the record and means including a photo responsive cell for converting the rotatively modulated rays into sound corresponding to the sound record.

7. A projector of sound moving pictures from a moving picture film bearing sequential frames of pictures and a sound track bearing a sound record comprising light rotative modulations including means to project the pictures one frame at a time, means to concurrently drive a portion of the film at uniform speed, means to scan the sound track of the portion of the film being driven at uniform speed with a beam of polarized light, the record on said sound track being effective to rotatively modulate rays of the scanning beam, a polarizing medium intersecting the scanning beam after the latter passes through the sound track of the film, said medium being oriented normally to substantially extinguish the rays of the beam passing through portions of the sound track not bearing light rotative modulations and effective to convert the rays which have been rotatively modulated by the record into intensity modulated rays, a photo-responsive cell to receive said intensity modulated rays, an amplifier having input and output circuits with its input circuit connected to said photo-responsive cell and means connected to the output circuit of said amplifier to produce sound waves corresponding to the record on the sound track of the film.

8. A projector as defined by claim 7 with color filter means interposed in the scanning beam.

9. A reproducer of sound from a variable density, variable area or variable light rotative sound track on a moving picture film including means to project the pictures of said film, means to drive concurrently a portion of the film at a uniform rate, means to project a scanning beam through the sound track of the film as it is being driven at said uniform rate, a photo-cell receiver for the scanning beam responsive to intensity modulations of the scanning beam, said modulations being effected directly by the passage of the scanning beam through a variable density or variable area sound track, means to polarize the scanning beam for employment with film bearing a variable light rotative sound track, the latter said track being effective to rotatively modulate the scanning beam, means interposed between the film and the photo-cell to convert light rotative modulations of the scanning beam into intensity modulations, and means controlled by the photo-cell for producing sound waves corresponding to the intensity modulations of the scanning beam received by the photo-cell.

10. A projector of sound moving pictures from a film of birefringent material bearing sequential frames of picture transparencies and a sound track comprising variations in the birefringency of the film to form a sound record, including means to project the pictures in sequence a frame at a time, means to drive concurrently a portion of the film at substantially uniform speed, means to scan the sound track of latter said portion of the film as it is being driven with polarized light which the variations in birefringency of the record rotatively modulates and means to convert the rotatively modulated light into sound.

11. A projector of moving pictures from a film bearing sequential frames of picture transparencies and a signal record comprising light rotative modulations including means to project the pictures in sequence a frame at a time, means to drive concurrently a portion of the film at constant speed, means to scan the signal record of the portion of the film being driven at constant speed with polarized light to which the signal record imparts rotative modulations and means to convert the rotative modulations into signals.

12. A stereophonic sound-reproducing system comprising, in combination, means for projecting a beam of polarized light, a light-transmitting film having birefringent properties adapted to be moved across the path of said beam and comprising two superimposed sound records, one of said sound records consisting in variations in the birefringency of the film in accordance with first recorded sound waves and the second of said sound records adapted to vary the total intensity of the beam in accordance with second recorded sound waves, and means to separately reproduce the two recorded sound waves in response to light of the beam which passes through the film.

JUDSON O'D. SHEPHERD.

REFERENCES CITED

The following references are of record in the file of this patent:

UNITED STATES PATENTS

| Number | Name | Date |
| --- | --- | --- |
| 1,185,056 | Byron | May 30, 1916 |
| 1,500,037 | Reisz | July 1, 1924 |
| 1,589,139 | Foley | June 15, 1926 |
| 1,260,338 | Craig | Mar. 26, 1918 |
| 1,275,189 | Rutzen | Aug. 6, 1918 |
| 1,713,503 | Von Madaler | May 14, 1929 |
| 1,446,246 | De Forest | Feb. 20, 1923 |
| 1,653,467 | O'Neill | Dec. 20, 1927 |
| 2,101,121 | Wixon | Dec. 7, 1937 |
| 1,999,754 | Evans | Apr. 30, 1935 |
| 2,256,093 | Land | Sept. 16, 1941 |
| 1,905,732 | Miller | Apr. 25, 1933 |
| 1,710,677 | Cawley | Apr. 23, 1929 |
| 1,808,046 | Kuchenmeister | June 2, 1931 |
| 1,919,116 | Miller | July 18, 1933 |
| 2,263,316 | Ryan | Nov. 18, 1941 |